US012621654B2

(12) United States Patent (10) Patent No.: US 12,621,654 B2
Liu (45) Date of Patent: May 5, 2026

(54) COMMUNICATION METHOD AND APPARATUS FOR RANDOM ACCESS, AND COMPUTER-READABLE STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 471 days.

(21) Appl. No.: 17/912,703

(22) PCT Filed: Mar. 23, 2020

(86) PCT No.: PCT/CN2020/080723
§ 371 (c)(1),
(2) Date: Sep. 19, 2022

(87) PCT Pub. No.: WO2021/189202
PCT Pub. Date: Sep. 30, 2021

(65) Prior Publication Data
US 2023/0180298 A1     Jun. 8, 2023

(51) Int. Cl.
*H04W 8/22* (2009.01)
*H04W 24/02* (2009.01)
(Continued)

(52) U.S. Cl.
CPC ............. *H04W 8/22* (2013.01); *H04W 24/02* (2013.01); *H04W 74/006* (2013.01); *H04W 74/0833* (2013.01); *H04W 74/0836* (2024.01)

(58) Field of Classification Search
CPC ... H04W 74/0833; H04W 8/22; H04W 48/12; H04W 48/16; H04W 74/0836; H04W 74/006; H04W 24/02
See application file for complete search history.

(56) References Cited

U.S. PATENT DOCUMENTS

2020/0221308 A1*   7/2020   Liao ........................ H04L 5/001
2021/0144777 A1*   5/2021   Tang ................... H04W 74/004
(Continued)

FOREIGN PATENT DOCUMENTS

CN          105764152 A       7/2016
CN          107041014 A       8/2017
(Continued)

OTHER PUBLICATIONS

Techplayon, 5G NR Bandwidth Part (BWP)—Feb. 14, 2020, total 3 pages (Year: 2020).*
(Continued)

*Primary Examiner* — Brian J. Gillis
*Assistant Examiner* — Chhian (Amy) Ling
(74) *Attorney, Agent, or Firm* — Finnegan, Henderson, Farabow, Garrett & Dunner, L.L.P.

(57) ABSTRACT
A communication method for random access includes: an access network device generating configuration information, the configuration information including a first random access parameter of a first terminal and a second random access parameter of a second terminal, the first terminal and the second terminal having different capabilities and/or types, and the first random access parameter and the second random access parameter being at least partially different; and the access network device sending the configuration information.

16 Claims, 5 Drawing Sheets

(51) Int. Cl.

| | | |
|---|---|---|
| *H04W 74/00* | (2009.01) | |
| *H04W 74/0833* | (2024.01) | |
| *H04W 74/0836* | (2024.01) | |

(56) References Cited

U.S. PATENT DOCUMENTS

| | | | | |
|---|---|---|---|---|
| 2021/0392693 A1* | 12/2021 | Kanno | ................... | H04W 72/02 |
| 2022/0132588 A1* | 4/2022 | Loehr | ................... | H04W 80/02 |
| 2022/0295357 A1* | 9/2022 | Jang | ................... | H04W 74/0838 |
| 2022/0346158 A1* | 10/2022 | Xu | ..................... | H04W 74/0841 |
| 2022/0408478 A1* | 12/2022 | Christoffersson | ... | H04W 74/006 |
| 2023/0007698 A1* | 1/2023 | Zhang | ............... | H04W 72/0453 |
| 2023/0007702 A1* | 1/2023 | Park | ....................... | H04L 5/0094 |
| 2023/0009933 A1* | 1/2023 | Li | ......................... | H04L 5/0044 |

FOREIGN PATENT DOCUMENTS

| | | |
|---|---|---|
| CN | 109644326 A | 4/2019 |
| EP | 3331182 A1 | 6/2018 |
| WO | WO 2018085726 A1 | 5/2018 |
| WO | WO 2018202060 A1 | 11/2018 |
| WO | WO-2021077343 A1 * | 4/2021 ........... H04W 74/08 |

OTHER PUBLICATIONS

Shi, WO 2021077343 A1, "Wireless Communication Method and Terminal Device", 30 Pages. (Year: 2021).*

European Patent Office, Extended European Search Report issued in Application No. 20927967.8, Mar. 30, 2023, 10 pages.

Examination report for Indian Application No. 202247059297, issued Dec. 23, 2022, 6 pages.

International Search Report and Written Opinion of International Application No. PCT/CN2020/080723, dated Dec. 24, 2020, 15 pages.

Search Report for EP application 20927967.8, dated Aug. 14, 2025.

Samsung, "Single Carrier Wide BW Operational Aspects", R1-1700941, 3GPP TSG RAN WG1 NR-Adhoc, Spokane, US, Jan. 16-20, 2017.

* cited by examiner

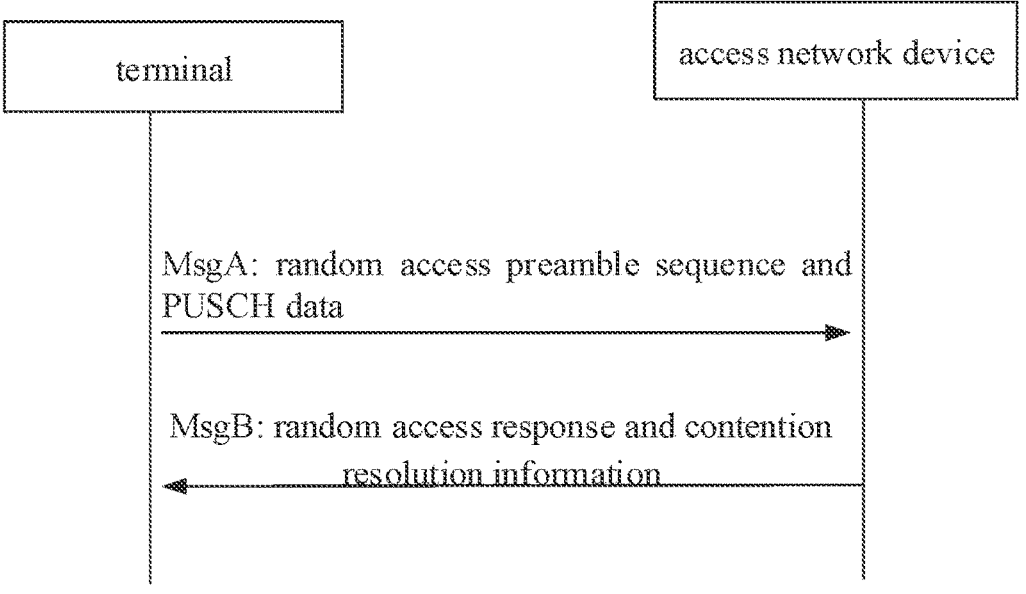
FIG. 3
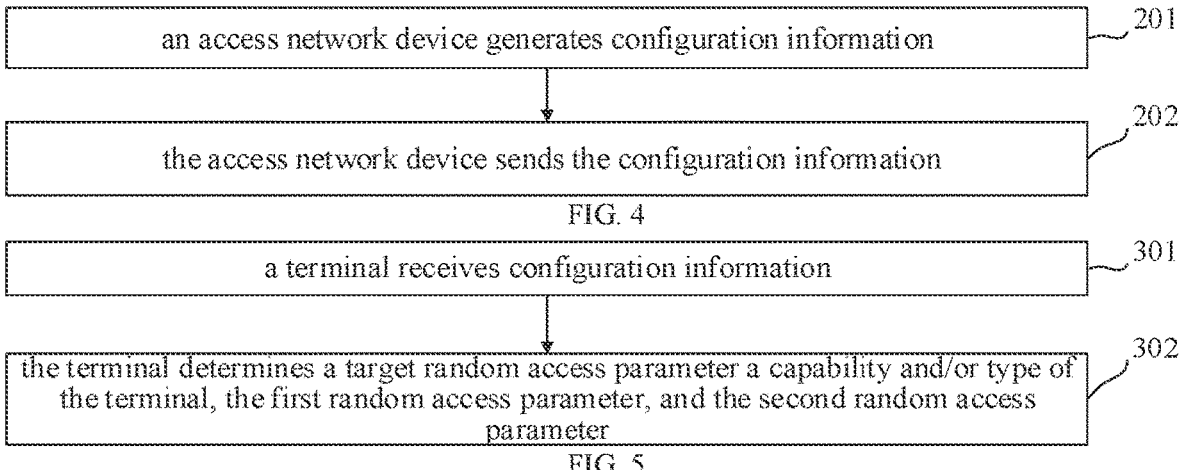
an access network device generates configuration information     201
the access network device sends the configuration information     202
FIG. 4
a terminal receives configuration information     301
the terminal determines a target random access parameter a capability and/or type of the terminal, the first random access parameter, and the second random access parameter     302
FIG. 5

COMMUNICATION METHOD AND APPARATUS FOR RANDOM ACCESS, AND COMPUTER-READABLE STORAGE MEDIUM

CROSS-REFERENCE TO RELATED APPLICATION

This application is a U.S. national phase application of International Application No. PCT/CN2020/080723, filed on Mar. 23, 2020, the content of which is hereby incorporated by reference in its entirety.

TECHNICAL FIELD

The disclosure relates to a field of communication technologies, and particularly to a communication method for random access, a communication apparatus for random access and a computer-readable storage medium.

BACKGROUND

Random access refers to a process from sending by a user a random access preamble sequence to try to access a network to establishing a basic signaling connection between the network and the user, configured to establish a data communication between a terminal and the network. In related arts, an access network device configures the same random access parameter for all terminals in the network. The effect of the random access performed by some terminals, such as the terminals with poor capabilities using the random access parameter is bad, which cannot meet requirements of the terminals.

SUMMARY

Embodiments of the disclosure provide a communication method for random access, communication apparatus for random access, and a computer-readable storage medium.

According to a first aspect of embodiments of the disclosure, a communication method for random access is provided. The method includes generating configuration information, in which the configuration information includes a first random access parameter of a first terminal and a second random access parameter of a second terminal, the first terminal and the second terminal have different capabilities and/or types, and the first random access parameter is at least partially different from the second random access parameter; and sending the configuration information.

According to a second aspect of the embodiments of the disclosure, a communication method for random access is provided. The method includes receiving configuration information, in which the configuration information includes a first random access parameter of a first terminal and a second random access parameter of a second terminal, the first terminal and the second terminal have different capabilities and/or types, and the first random access parameter is at least partially different from the second random access parameter; and determining a target random access parameter based on the first random access parameter, the second random access parameter, and a capability and/or type of a terminal.

According to a third aspect of the embodiments of the disclosure, a communication apparatus for random access is provided. The apparatus includes a processor and a memory configured to store instructions executable by the processor. The processor is configured to load and execute the instructions to perform the communication method for random access according to the first aspect or the second aspect of the embodiments of the disclosure.

According to a fourth aspect of the embodiments of the disclosure, a computer-readable storage medium is provided. When instructions in the computer-readable storage medium are executed by a processor, the processor is caused to perform the communication method for random access according to the first aspect or the second aspect of the embodiments of the disclosure.

The technical solution provided in the embodiments of the disclosure may have at least the following beneficial effects.

By configuring different random access parameters for terminals with different capabilities and/or terminals in different types, different terminals may use random access parameters suitable for themselves to perform the random access, thus ensuring random access performance of the terminal.

It is to be understood that both the foregoing general description and the following detailed description are exemplary and explanatory only, and are not restrictive of the present disclosure, as claimed.

BRIEF DESCRIPTION OF THE DRAWINGS

The accompanying drawings, which are incorporated in and constitute a part of this specification, illustrate embodiments consistent with the disclosure, and serve to explain the principles of the disclosure together with the specification.

FIG. 3 is a flowchart illustrating a 2-step contention-based random access procedure based on according to an embodiment.

FIG. 4 is a flowchart illustrating a communication method for random access according to an embodiment of the disclosure.

FIG. 5 is a flowchart illustrating a communication method for random access according to an embodiment of the disclosure.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The terms used in the embodiments of the disclosure are only for the purpose of describing particular embodiments, but should not be construed to limit the embodiments of the disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be further understood that, although terms such as "first", "second" and "third" are used herein for describing various elements, these elements should not be limited by these terms. These terms are only used for distinguishing one element from another element. For example, first information may also be called second information, and similarly, the second information may also be called the first information, without departing from the scope of the present disclosure. As used herein, the term "if" may be construed to mean "when" or "upon" or "in response to determining" or "in accordance with a determination" or "in response to detecting," that a stated condition precedent is true, depending on the context.

Figure 1:
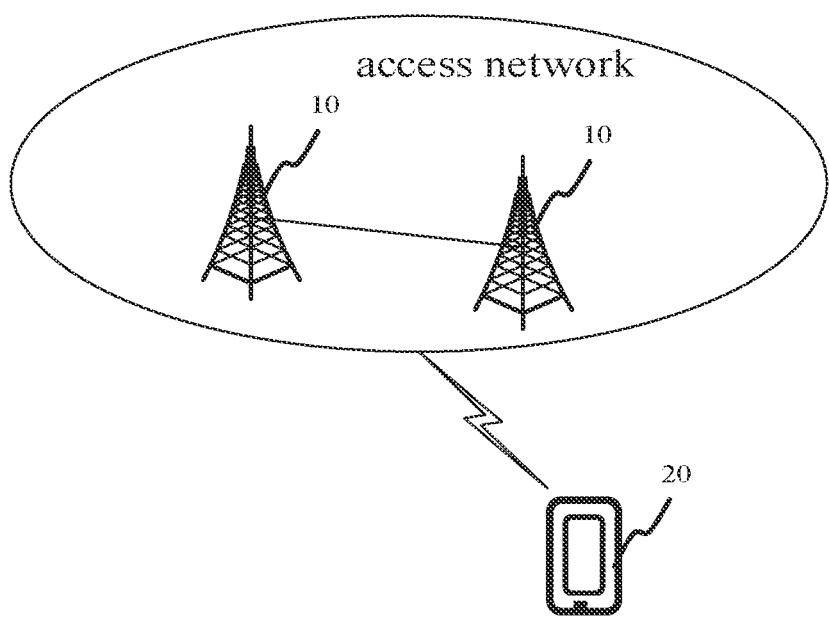
FIG. 1 is a schematic diagram illustrating a communication system according to an embodiment.

It should be further understood that, although the steps are described in a numbered manner for ease of understanding in the embodiments of the present disclosure, these numbers do not represent the execution order of the steps, nor do they mean that the sequentially numbered steps must be performed together. It should be understood that, one or several steps among the multiple steps numbered in sequence may be performed independently to solve the corresponding technical problem and achieve a predetermined technical solution. Even though multiple steps are exemplarily listed together in the drawings, it does not mean that these steps must be performed together; the drawings exemplarily list these steps together for ease of understanding FIG. 1 is a schematic diagram illustrating a communication system according to an embodiment. As illustrated in FIG. 1, the mobile communication system may include an access network device 10 and a terminal 20.

The access network device 10 is deployed in a wireless access network to provide a wireless access function for the terminal 20. The access network device 10 may be a base station (BS). The access network device 10 may perform a wireless communication with the terminal via one or more antennas. The access network device 10 may provide communication coverage in a geographical region where it is located. The base station may include various types of base stations, such as a macro base station, a micro base station, a relay station, an access point, etc. In some embodiments, the bases station may be referred to as a base station transceiver, a wireless base station, an access point, a wireless transceiver, a basic service set (BSS), an extended service set (ESS), a NodeB, an evolved NodeB (eNB or eNodeB) or other appropriate terms by those skilled in the art. For example, in the 5G system, the base station is referred to as gNB. For ease of description, in the embodiments of the present disclosure, the above devices for providing a wireless communication function to the terminal 20 are collectively called "access network device".

Terminals 20 may be deployed in the entire mobile communication system. Each terminal 20 may be static or moving. The terminal 20 may be called by those skilled in the art a mobile station, a user station, a move unit, a user unit, a wireless unit, a remote unit, a mobile device, a user device, a wireless device, a wireless communication device, a remote device, a mobile user station, an access terminal, a wireless terminal, a remote terminal, a handheld device, a user agent, a mobile client, a client or other appropriate terms. The terminal 20 may be a cellar phone, a personal digital assistant (PDA), a wireless modulator, a wireless communication device, a handheld device, a tablet computer, a laptop computer, a wireless phone, a wireless local loop (WLL) station and so on. The terminal 20 may communicates with the access network device 10 in the mobile communication system.

The access network device 10 and the terminal 20 may communicate with each other through an air interface technology, such as a cellar technology. A communication link between the access network device 10 and the terminal 20 may include: a downlink (DL) transmission from the access network device 10 to the terminal 20, and/or an uplink (UL) transmission from the terminal 20 to the access network device 10. The downlink transmission may also be referred to as a forward link transmission. The uplink transmission may also be referred to as a backward link transmission. In some examples, the downlink transmission may include transmission of a discovery signal, the discovery signal may include a reference signal and/or a synchronization signal.

The mobile communication system shown in FIG. 1 may be a long term evolution (LTE) system, or may be a next generation system based on the LTE system, such as a LTE-Advanced (LTE-A) system or a $5^{th}$ generation (5G) system (also called NR system), or may be a next generation system based on the 5G system, and so on. In the embodiments of the disclosure, the terms "system" and "network" are exchangeable, and those skilled in the art may understand the meanings of the terms.

The communication system and business scenarios described in the embodiments of the present disclosure are used to better explain the technical solutions of the present disclosure, but not constructed to limit the technical solutions of the present disclosure. It would be appreciated by those skilled in the art that with the evolution of the communication system and the emergence of new business scenarios, the technical solutions of the present disclosure may also be suitable to similar technical problems.

In order to fit requirements of different communication services, the communication system illustrated in FIG. 1 includes two kinds of terminals, i.e., first terminals and second terminals. These two kinds of terminals have different capabilities and/or types. For example, the capability and/or type of the terminal is determined based on a maximum transmission bandwidth supported by the terminal. In the following, for example, assume that the maximum transmission bandwidth supported by the first terminal is smaller than the maximum transmission bandwidth supported by the second terminal.

In the embodiments of the disclosure, the first terminal may also referred to as a reduced capability NR device, a reduced capability UE or a capability restricted UE. For example, the first terminal may be a sensor in an industry IoT (Internet of Things), such as a wireless video monitoring device in a smart city, and a wearable device, such as a bracelet, a watch, and a healthy monitoring device and so on. The second terminal may be a normal device, a common device, such as an enhanced mobile broadband (eMBB) device and so on.

In the related art, the random access procedure includes a contention-based random access procedure and a non-contention-based random access procedure. At present, most terminals adopt the contention-based random access procedure. The contention-based random access procedure includes a 4-step random access procedure and a 2-step random access procedure. These two contention-based random access procedures will be described below.

Figure 2:
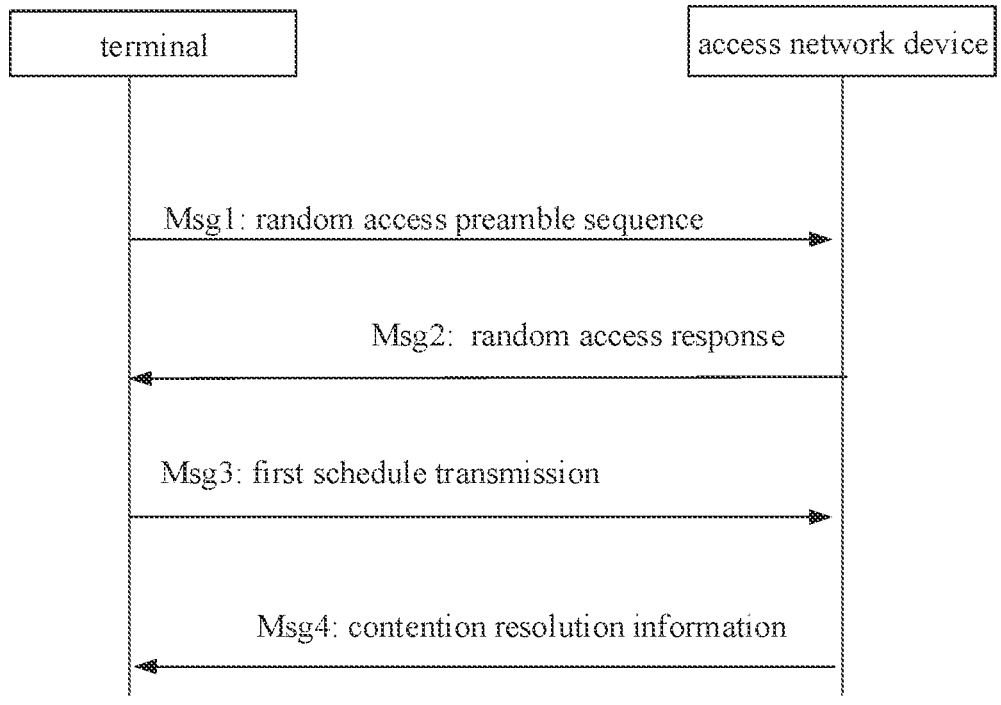
FIG. 2 is a flowchart illustrating a 4-step contention-based random access procedure based on according to an embodiment.

When the contention-based random access procedure is completed by four steps, each step includes transmission of one message (Msg). In the standard, the four steps may be called Msg1-Msg4. FIG. 2 is a flowchart illustrating a 4-step contention-based random access procedure. As illustrated in FIG. 2, the 4-step random access procedure include the followings.

In the first step, a terminal sends Msg1 to an access network device. The Msg1 includes a random access preamble sequence.

A total number of the random access preamble sequences available in each cell is 64. Two subsets are defined in the 64 random access preamble sequences. A set of random access preamble sequences in each subset can be configured as a part of system information to be informed to the terminal. When performing the contention-based random access procedure, the terminal may randomly select one random access preamble sequence from the two subsets, and sends the selected random access preamble sequence on a physical random access channel (PRACH) resource (i.e., resource).

The random access preamble sequence that can be used in the contention-based random access procedure and the PRACH resource for sending the random access preamble sequence are configured by the access network device, and a configuration result is informed to the terminal in the cell through the system information.

In the second step, the access network device sends Msg2 to the terminal. The Msg2 includes a random access response (RAR).

One piece of Msg2 may include identifiers (i.e., indexes) of preamble sequences sent by different terminals, and respond to random access requests of multiple terminals simultaneously. The terminal determines whether a random access response is received by detecting whether the Msg2 carries the identifier of the preamble sequence sent by itself.

The access network device schedules the Msg2 using a physical downlink control channel (PDCCH), and performs addressing (also referred to as scrambling) through a random access-radio network temporary identifier (RA-RNTI). The RA-RNTI is determined by a positon of a PRACH resource carrying the Msg1.

The Msg2 may include parameters such as an identifier of the random access preamble sequence corresponding to the Msg1, an uplink transmission timing advance, an uplink resource assigned to the terminal, a temporary cell-radio network temporary identifier (C-RNTI), and so on.

In the third step, the terminal sends Msg3 to the access network device.

After the terminal correctly receives the Msg2, the terminal transmits the Msg3 in the uplink resource assigned by the Msg2 to complete the first schedule transmission.

The Msg3 may include identity information of the terminal, for example C-RNTI or temporary C-RNTI.

In the fourth step, the access network device sends Msg4 to the terminal.

The access network device and the terminal completes a final contention resolution through the Msg4. Content of the Msg4 corresponds to content of the Msg3.

If the terminal is not assigned with a C-RNTI, the access network device may use the PDCCH scrambled with a temporary C-RNTI to schedule the Msg4. The terminal uses the temporary C-RNTI to perform addressing on the PDCCH, so as to obtain a position of a resource of the Msg4. After the addressing is successfully performed, the Msg4 is obtained from the position of the resource. The Msg4 carries a contention resolution identity (CRI) through a media access control address (MAC) control element (CE). After receiving the MAC CE, the terminal compares it with the identity information sent in the Msg3, if they are the same, it is determined that the contention resolution is successful, and the terminal determines that the random access is completed.

If the terminal is assigned with a C-RNTI, the access network device may use the PDCCH scrambled with the C-RNTI to schedule the Msg4. The terminal uses the C-RNTI to perform addressing on the PDCCH. If the addressing is successfully performed, it indicates that the contention resolution is successful, and the terminal determines that the random access is completed.

The 2-step random access procedure may be obtained by integrating the above-mentioned 4-step random access procedure. FIG. 3 is a flowchart illustrating a 2-step contention-based random access procedure based on according to an embodiment. As illustrated in FIG. 3, the 2-step random access procedure includes the followings.

In the first step, a terminal sends MsgA to an access network device, and the base station receives the MsgA.

The MsgA includes a random access preamble sequence and physical uplink shared channel (PUSCH) data. The PUSCH data may include identity information of a terminal, such as C-RNTI. That is, the MsgA includes contents of the Msg1 and the Msg3.

In the second step, the access network device sends MsgB to the terminal, and the terminal receives the MsgB.

The MsgB includes a random access response and contention resolution information. That is, the MsgB includes contents of the Msg2 and the Msg4. The random access response includes an identifier of a random access preamble sequence. The contention resolution information includes a contention resolution identifier.

FIG. 4 is a flowchart illustrating a communication method for random access according to an embodiment of the disclosure. As illustrated in FIG. 4, the method includes the followings.

In block 201, an access network device generates configuration information. The configuration information includes a first random access parameter of a first terminal and a second random access parameter of a second terminal. The first terminal and the second terminal have different capabilities and/or types. The first random access parameter and the second random access parameter are at least partially different.

In block 202, the access network device sends the configuration information.

Optionally, the capabilities and/or types of the first terminal and the second terminal are determined based on a maximum transmission bandwidth supported by each of the first terminal and the second terminal, and the maximum transmission bandwidth supported by the first terminal is smaller than the maximum transmission bandwidth supported by the second terminal.

Optionally, the first random access parameter includes a first uplink initial access bandwidth, the second random access parameter includes a second uplink initial access bandwidth, and the first uplink initial access bandwidth at least partially overlaps the second uplink initial access bandwidth in a frequency domain.

Optionally, the first random access parameter further includes at least one of the followings: first indication information, configured to indicate whether the first terminal supports a 2-step random access; and a first random access resource.

Optionally, the first indication information indicates that the first terminal supports the 2-step random access, the first random access resource includes a resource for the 2-step random access and a resource for a 4-step random access; or the first indication information indicates that the first terminal does not support the 2-step random access, the first random access resource includes a resource for a 4-step random access.

Optionally, the first indication information indicates that the first terminal supports the 2-step random access, the first random access parameter further includes second indication information configured to indicate a modulation and demodulation scheme for transmitting a message B.

Optionally, the second random access parameter further includes a second random access resource, and the second random access resource is different from the first random access resource.

Optionally, the first random access resource includes a random access occasion (RO) and/or a physical uplink shared channel (PUSCH) resource for transmitting a message A.

Optionally, the second random access parameter further includes a second random access resource, the second random access resource includes a random access occasion (RO) and/or a physical uplink shared channel (PUSCH) resource for transmitting the message A. The RO included in the first random access resource is different from the RO included in the second random access resource, and/or the PUSCH resource included in the first random access resource is different from the PUSCH resource included in the second random access resource.

Optionally, the first random access resource includes a random access occasion (RO), and the first random access parameter further includes third indication information configured to indicate whether the RO supports the 2-step random access.

Optionally, the first random access parameter includes two sets of sub-parameters, and the two sets of sub-parameters correspond to different capabilities and/types of the first terminal.

Optionally, the first random access parameter includes a first uplink initial access bandwidth, the second random access parameter includes a second uplink initial access bandwidth, and the first uplink initial access bandwidth does not overlap the second uplink initial access bandwidth in a frequency domain.

Optionally, sending the configuration information includes sending the configuration information through a first message, in which the first message is a system message or a radio resource configuration message.

Optionally, the configuration information is sent through a first message, the first uplink initial access bandwidth overlaps the second uplink initial access bandwidth in the frequency domain, and the first uplink initial access bandwidth and the second uplink initial access bandwidth are indicated by a same filed in the first message.

It should be noted that the above steps in blocks 201-202 may be combined arbitrarily with the above optional steps.

FIG. 5 is a flowchart illustrating a communication method for random access according to an embodiment of the disclosure. As illustrated in FIG. 5, the method includes the followings.

In block 301, a terminal receives configuration information. The configuration information includes a first random access parameter of a first terminal and a second random access parameter of a second terminal, the first terminal and the second terminal have different capabilities and/or types, and the first random access parameter is at least partially different from the second random access parameter.

In block 302, the terminal determines a target random access parameter a capability and/or type of the terminal, the first random access parameter, and the second random access parameter.

Optionally, the capabilities and/or types of the first terminal and the second terminal are determined based on a maximum transmission bandwidth supported by each of the first terminal and the second terminal, and the maximum transmission bandwidth supported by the first terminal is smaller than the maximum transmission bandwidth supported by the second terminal.

Optionally, the first random access parameter includes a first uplink initial access bandwidth, the second random access parameter includes a second uplink initial access bandwidth, and the first uplink initial access bandwidth at least partially overlaps the second uplink initial access bandwidth in a frequency domain.

Optionally, the first random access parameter further includes at least one of the followings: first indication information, configured to indicate whether the first terminal supports a 2-step random access; and a first random access resource.

Optionally, the first indication information indicates that the first terminal supports the 2-step random access, the first random access resource includes a resource for the 2-step random access and a resource for a 4-step random access; or the first indication information indicates that the first terminal does not support the 2-step random access, the first random access resource includes a resource for a 4-step random access.

Optionally, the first indication information indicates that the first terminal supports the 2-step random access, the first random access parameter further includes second indication information configured to indicate a modulation and demodulation scheme for transmitting a message B.

Optionally, the second random access parameter further includes a second random access resource, and the second random access resource is different from the first random access resource.

Optionally, the first random access resource includes a random access occasion (RO) and/or a physical uplink shared channel (PUSCH) resource for transmitting a message A.

Optionally, the second random access parameter further includes a second random access resource, the second random access resource includes a random access occasion (RO) and/or a physical uplink shared channel (PUSCH) resource for transmitting the message A. The RO included in the first random access resource is different from the RO included in the second random access resource, and/or the PUSCH resource included in the first random access resource is different from the PUSCH resource included in the second random access resource.

Optionally, the random access resource includes a random access occasion (RO), and the first random access parameter further includes third indication information configured to indicate whether the RO supports the 2-step random access.

Optionally, the first random access parameter includes two sets of sub-parameters, and the two sets of sub-parameters correspond to different capabilities and/types of the first terminal.

Optionally, the first random access parameter includes a first uplink initial access bandwidth, the second random access parameter includes a second uplink initial access bandwidth, and the first uplink initial access bandwidth does not overlap the second uplink initial access bandwidth in a frequency domain.

Optionally, receiving the configuration information includes receiving the configuration information sent through a first message, in which the first message is a system message or a radio resource configuration message.

Optionally, the terminal receives the configuration information sent through a first message, the first uplink initial access bandwidth overlaps the second uplink initial access bandwidth in the frequency domain, and the first uplink initial access bandwidth and the second uplink initial access bandwidth are indicated by a same filed in the first message.

Optionally, the terminal is the first terminal, the first indication information indicates that the first terminal supports the 2-step random access, and the method further includes determining a random access mode; using a resource for the 2-step random access to send a message A, in response to determining that the random access mode is the 2-step random access; or using a resource for the 4-step random access to send a message 1, in response to determining that the random access mode is the 4-step random access.

Optionally, determining the random access mode includes determining a path loss value between the terminal and an access network device; and determining the random access mode based on a magnitude relation between the path loss value and a path loss threshold, in which the first terminal and the second terminal correspond to different path loss thresholds.

It should be noted that the above steps in blocks 301-302 may be combined arbitrarily with the above optional steps.

Figures 6, 7, 8:
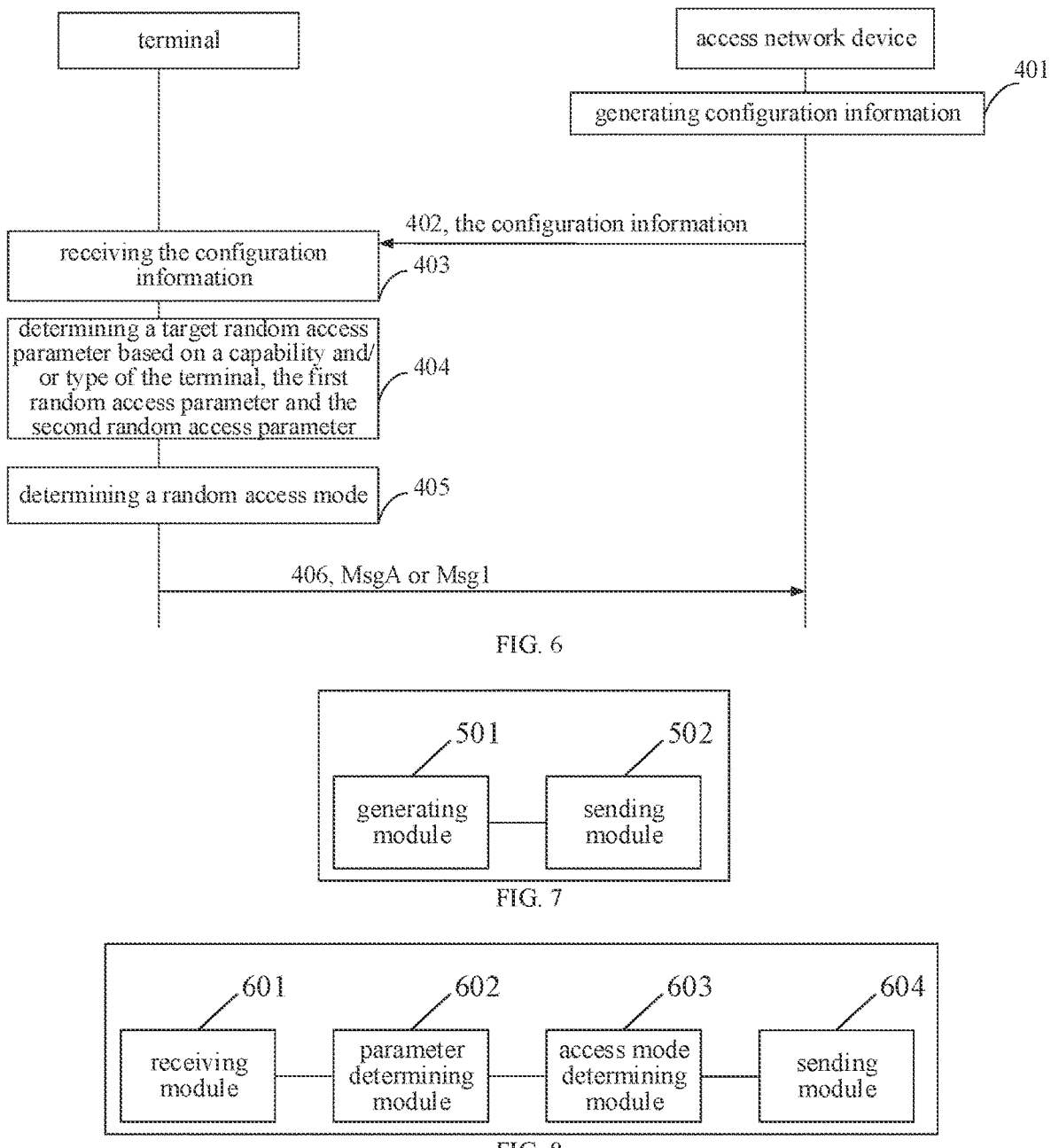
FIG. 6 is a flowchart illustrating a communication method for random access according to an embodiment of the disclosure.
FIG. 7 is a block diagram illustrating a communication apparatus for random access according to an embodiment of the disclosure.
FIG. 8 is a block diagram illustrating a communication apparatus for random access according to an embodiment of the disclosure.

FIG. 6 is a flowchart illustrating a communication method for random access according to an embodiment of the disclosure. The method may be collectively performed by an access network device and a terminal. As illustrated in FIG. 6, the method includes the followings.

In block 401, the access network device generates configuration information.

The configuration information includes a first random access parameter of a first terminal and a second random access parameter of a second terminal. The first terminal and the second terminal have different capabilities and/or types.

In some embodiments of the disclosure, the capabilities and/types of the first terminal and the second terminal are determined based on a maximum transmission bandwidth supported by each of the first terminal and the second terminal, and the maximum transmission bandwidth supported by the first terminal is smaller than the maximum transmission bandwidth supported by the second terminal.

For example, the first terminal is a reduced capability device, while the second terminal is an eMBB device. For a certain frequency band, the maximum transmission bandwidth supported by the first terminal is 20 M, and the maximum transmission bandwidth supported by the second terminal is 100 M.

The first random access parameter is partially different form the second random access parameter.

Optionally, the first random access parameter includes a first uplink initial access bandwidth, the second random access parameter includes a second uplink initial access bandwidth.

It should be noted that, in the embodiment of the disclosure, the initial access bandwidth may also be referred to as initial bandwidth part (initial BWP). The uplink refers to a transmission link from the terminal to the access network device. The downlink refers to a transmission link from the access network device to the terminal. For a random access procedure of the initial access, the uplink initial access bandwidth is used to send Msg1 or MsgA, so as to initiate the random access.

In a possible implementation, the first uplink initial access bandwidth at least partially overlaps the second uplink initial access bandwidth in a frequency domain. The first uplink initial access bandwidth and the second uplink initial access bandwidth may completely overlap each other in the frequency domain and occupy the same frequency domain resource. In other words, the first uplink initial access bandwidth and the second uplink initial access bandwidth may share an initial access bandwidth. The first uplink initial access bandwidth and the second uplink initial access bandwidth may partially overlap each other in the frequency domain. For example, the frequency domain resource of the first uplink initial access bandwidth may be a subset of the frequency domain resource of the second uplink initial access bandwidth. In another example, a part of the frequency domain resource of the first uplink initial access bandwidth may overlap a part of the frequency domain resource of the second uplink initial access bandwidth.

In another possible implementation, the first uplink initial access bandwidth does not overlap the second uplink initial access bandwidth in a frequency domain. In other words, the first terminal and the second terminal use different initial access bandwidths. By distinguishing the initial access bandwidths of terminals with different capabilities and/or terminals of different types, the random access resources of the terminals with different capabilities and/or terminals of different types may be distinguished in the frequency domain, such that a collision probability when the terminals with different capabilities and/or terminals of different types perform the random access is decreased, and a random access latency of the terminal is reduced. Meanwhile, an effect on the second terminal by the first terminal can be reduced, thus ensuring an access performance of the second terminal.

For example, in a case that the first terminal and the second terminal use respective initial access bandwidths, a field parallel to the existing filed "BWP-UplinkCommon (initialUplinkBWP)" is added to configure the first random access parameter corresponding to the first terminal.

Optionally, the first random access parameter further includes at least one of the followings, first indication information, configured to indicate whether the first terminal supports a 2-step random access; and a first random access resource. In the related art, the access network device may inform to all terminals in the network whether the access network device supports the 2-step random access through indication information. For example, when the access network device configures the indication information, it indicates the access network device supports the 2-step random access. If the access network device configures the indication information, it indicates that the indication information does not exist. If the access network device supports the 2-step random access, the terminal has the capability of supporting the 2-step random access may support the 2-step random access or the 4-step random access based on actual requirements. In the embodiment of the disclosure, through first indication information, the access network device may configure whether the first terminal in the network supports the 2-step random access, i.e., separate indication can be made for the terminal with a certain capability and/or the terminal of a certain type in the network, such that the random access procedure of the first terminal can be controlled without affecting the second terminal.

Optionally, the first indication information indicates that the first terminal supports the 2-step random access, the first random access resource includes a resource for the 2-step random access and a resource for a 4-step random access; or the first indication information indicates that the first terminal does not support the 2-step random access, the first random access resource includes a resource for a 4-step random access.

Optionally, if the first indication information indicates that the first terminal supports the 2-step random access, the first random access parameter further includes second indication information configured to indicate a modulation and demodulation scheme for transmitting a message B, to ensure a normal implementation of the 2-step random access.

Optionally, the second random access parameter may further include first indication information configured to indicate whether the second terminal supports the 2-step random access, and a second random access resource.

Optionally, the second random access resource is different from the first random access resource.

Optionally, the first random access resource includes a random access occasion (RO) and/or a physical uplink shared channel (PUSCH) resource for transmitting a message A. For example, the RO may be indicated by an index of the PRACH resource. The PUSCH resource may be indicated by a time-frequency position. The RO included in the first random access resource is different from the RO included in the second random access resource, and/or the PUSCH resource included in the first random access resource is different from the PUSCH resource included in the second random access resource. That is, the first random access resource is different from the second random access resource. By distinguishing the random access resources of the terminals with different capabilities and/or terminals of different types in the frequency domain and/or time domain, a collision probability when different terminals perform the random access is decreased, and a random access latency of the terminal is reduced. Meanwhile, an effect on the second terminal by the first terminal can be reduced, thus ensuring an access performance of the second terminal.

Optionally, the first random access parameter may further include third indication information configured to indicate whether the RO supports the 2-step random access. For the RO available to the first terminal, it is configured whether the 2-step random access is supported, thus the implementation is more flexible.

Optionally, the first random access parameter includes two sets of sub-parameters, and the two sets of sub-parameters correspond to different capabilities and/types of the first terminal.

For example, the first terminals may be classified into two kinds based on the maximum transmission bandwidths supported by the first terminals. For example, the maximum transmission bandwidth supported by the first kind of first terminal is 20 M, and the maximum transmission bandwidth supported by the second kind of first terminal is 10 M. One parameter can be used to express the parameter shared by the two kinds of first terminals, such as the first uplink initial access bandwidth. The parameters different for the two kinds of first terminals may be indicated respectively, for example, the two kinds of first terminals respectively correspond to first indication information, the first indication information corresponding to the first kind of first terminal indicates that the first terminal supports the 2-step random access, the first indication information corresponding to the second kind of first terminal indicates that the first terminal does not support the 2-step random access. By classifying the first terminals, the network resources may be configured pointedly, thus facilitating improving usage of the network resources and refining control on the first terminals.

In block 402, the access network device sends the configuration information.

For example, the access network device may send the configuration information through a first message. The first message may be a system message or a radio resource control (RRC) message.

The same parameter in the first random access parameter and the second random access parameter may be indicated by the same field in the first message, so as to save amount of data to be transmitted. For example, if the first uplink initial access bandwidth overlaps the second uplink initial access bandwidth in the frequency domain, the first uplink initial access bandwidth and the second uplink initial access bandwidth are indicated by the same field in the first message.

In another possible implementation, a field may be added to an existing message, to indicate the first uplink initial access bandwidth. For example, a filed parallel to an existing filed "BWP-UplinkCommon (initialUplinkBWP)" may be added to the system information block (SIB), to carry the first random access parameter. Here, the first random access parameter at least includes the first uplink initial access bandwidth, and may further include at least one of the followings: the first indication information configured to indicate whether the first terminal supports the 2-step random access, the first random access resource. In this case, the added field may include at least one subfield, configured to carry the first random access parameter other than the initial access bandwidth, such as the first indication information configured to indicate whether the first terminal supports the 2-step random access, the first random access resource, and so on.

It should be noted that, the subfield in the added filed may be identical to the parameter type of the original subfield in the field, or may be partially same to the parameter type of the original subfield in the field, which is not limited herein, as long as the subfield can carry the required parameter.

Different parameters in the first random access parameter and the second random access parameter may be indicated by different fields in the first message. Take the first message being SIB as an example. If related parameters for the 2-step random access are different, a filed parallel to an existing filed "rach-ConfigCommonTwoStepRA-r16" may be added to the existing information, to carry the related parameters for the 2-step random access of the first terminal, such as the first indication information. For another example, if related parameters for the PUSCH resource of MsgA are different, a filed parallel to an existing filed "msgA-PUSCH-Config-r16" may be added to the existing information, to indicate the PUSCH resource in the first random access resource.

In block 403, the terminal receives the configuration information.

In the step of the block 403, the terminal receives the configuration information sent through a first message.

In block 404, the terminal determines a target random access parameter based on a capability and/or type of the terminal, the first random access parameter and the second random access parameter.

Optionally, the block 404 may include: if the capability and/or type of the terminal indicates that the terminal is the first terminal, the first random access parameter is determined as the target random access parameter; or if the capability and/or type of the terminal indicates that the terminal is the second terminal, the second random access parameter is determined as the target random access parameter.

Optionally, if the terminal needs to initiate an initial random access, the method may further includes blocks 405-406.

In block 405, the terminal determines a random access mode.

For example, the block 405 may include determining by the terminal a path loss value between the terminal and the access network device, and determining by the terminal the random access mode based on a magnitude relation between the path loss value and a path loss threshold.

For example, if the path loss value is greater than the path loss threshold, the 4-step random access is determined as the random access mode. Or, if the path loss value is less than the path loss threshold, the 2-step random access is determined as the random access mode.

In the embodiment of the disclosure, the first terminal and the second terminal correspond to different path loss thresholds.

In block 406, the terminal sends MsgA or Msg1 to the access network device based on the determined random access mode.

The block 406 may include: in responding to the determined random access mode is the 2-step random access, the terminal using the resource for the 2-step random access to send the MsgA; or in response to the determined random access mode is the 4-step random access, the terminal using the resource for the 4-step random access to send the Msg1.

It should be noted that, regarding the process after the terminal uses the resource for the 2-step random access to send the MsgA, reference can be made to related contents described with reference to FIG. 3. With regard to the process after the terminal uses the resource for the 4-step random access to send the Msg1, reference can be made to related contents described with reference to FIG. 2, which are not described here.

According to the embodiment of the disclosure, by configuring different random access parameters for the terminals with different capabilities and/or the terminals of different types, different terminals may use respective appropriate random access parameters to perform the random access, thus ensuring random access performance of the terminal.

FIG. 7 is a block diagram illustrating a communication apparatus for random access according to an embodiment of the disclosure. The apparatus has a function to implement the access network device described in the above method embodiments, the function may be implemented by a hardware, or by a software executed by a hardware. As illustrated in FIG. 7, the apparatus includes a generating module 501 and a sending module 502.

The generating module 501 is configured to generate configuration information, in which the configuration information includes a first random access parameter of a first terminal and a second random access parameter of a second terminal, the first terminal and the second terminal have different capabilities and/or types, and the first random access parameter is at least partially different from the second random access parameter.

The sending module 502 is configured to send the configuration information.

Optionally, the capabilities and/or types of the first terminal and the second terminal are determined based on a maximum transmission bandwidth supported by each of the first terminal and the second terminal, and the maximum transmission bandwidth supported by the first terminal is smaller than the maximum transmission bandwidth supported by the second terminal.

Optionally, the first random access parameter includes a first uplink initial access bandwidth, the second random access parameter includes a second uplink initial access bandwidth, and the first uplink initial access bandwidth at least partially overlaps the second uplink initial access bandwidth in a frequency domain.

Optionally, the first random access parameter further includes at least one of the followings: first indication information, configured to indicate whether the first terminal supports a 2-step random access; and a first random access resource.

Optionally, the first indication information indicates that the first terminal supports the 2-step random access, the first random access resource includes a resource for the 2-step random access and a resource for a 4-step random access; or the first indication information indicates that the first terminal does not support the 2-step random access, the first random access resource includes a resource for a 4-step random access.

Optionally, the first indication information indicates that the first terminal supports the 2-step random access, the first random access parameter further includes second indication information configured to indicate a modulation and demodulation scheme for transmitting a message B.

Optionally, the second random access parameter further includes a second random access resource, and the second random access resource is different from the first random access resource.

Optionally, the first random access resource includes a random access occasion (RO) and/or a physical uplink shared channel (PUSCH) resource for transmitting a message A.

Optionally, the second random access parameter further includes a second random access resource, the second random access resource includes a random access occasion (RO) and/or a physical uplink shared channel (PUSCH) resource for transmitting the message A. The RO included in the first random access resource is different from the RO included in the second random access resource, and/or the PUSCH resource included in the first random access resource is different from the PUSCH resource included in the second random access resource.

Optionally, the first random access resource includes a random access occasion (RO), and the first random access parameter further includes third indication information configured to indicate whether the RO supports the 2-step random access.

Optionally, the first random access parameter includes two sets of sub-parameters, and the two sets of sub-parameters correspond to different capabilities and/types of the first terminal.

Optionally, the first random access parameter includes a first uplink initial access bandwidth, the second random access parameter includes a second uplink initial access bandwidth, and the first uplink initial access bandwidth does not overlap the second uplink initial access bandwidth in a frequency domain.

Optionally, the sending module 502 is configured to send the configuration information through a first message, in which the first message is a system message or a radio resource configuration message.

Optionally, the sending module 502 is configured to send the configuration information through a first message, the first uplink initial access bandwidth overlaps the second uplink initial access bandwidth in the frequency domain, and the first uplink initial access bandwidth and the second uplink initial access bandwidth are indicated by a same filed in the first message.

FIG. 8 is a block diagram illustrating a communication apparatus for random access according to an embodiment of the disclosure. The apparatus has a function to implement the terminal described in the above method embodiments, the function may be implemented by a hardware, or by a software executed by a hardware. As illustrated in FIG. 8, the apparatus includes a receiving module 601 and a parameter determining module 602.

The receiving module 601 is configured to receive configuration information, in which the configuration information includes a first random access parameter of a first terminal and a second random access parameter of a second terminal, the first terminal and the second terminal have different capabilities and/or types, and the first random access parameter is at least partially different from the second random access parameter.

The parameter determining module 602 is configured to determine a target random access parameter based on the first random access parameter, the second random access parameter, and a capability and/or type of a terminal.

Optionally, the capabilities and/or types of the first terminal and the second terminal are determined based on maximum transmission bandwidths supported by the first terminal and the second terminal, and the maximum transmission bandwidth supported by the first terminal is smaller than the maximum transmission bandwidth supported by the second terminal.

Optionally, the first random access parameter includes a first uplink initial access bandwidth, the second random access parameter includes a second uplink initial access bandwidth, and the first uplink initial access bandwidth at least partially overlaps the second uplink initial access bandwidth in a frequency domain.

Optionally, the first random access parameter further includes at least one of the followings: first indication information, configured to indicate whether the first terminal supports a 2-step random access; and a first random access resource.

Optionally, the first indication information indicates that the first terminal supports the 2-step random access, the first random access resource includes a resource for the 2-step random access and a resource for a 4-step random access; or the first indication information indicates that the first terminal does not support the 2-step random access, the first random access resource includes a resource for a 4-step random access.

Optionally, the first indication information indicates that the first terminal supports the 2-step random access, the first random access parameter further includes second indication information configured to indicate a modulation and demodulation scheme for transmitting a message B.

Optionally, the second random access parameter further includes a second random access resource, and the second random access resource is different from the first random access resource.

Optionally, the first random access resource includes a random access occasion (RO) and/or a physical uplink shared channel (PUSCH) resource for transmitting a message A.

Optionally, the second random access parameter further includes a second random access resource, the second random access resource includes a random access occasion (RO) and/or a physical uplink shared channel (PUSCH) resource for transmitting the message A. The RO included in the first random access resource is different from the RO included in the second random access resource, and/or the PUSCH resource included in the first random access resource is different from the PUSCH resource included in the second random access resource.

Optionally, the random access resource includes a random access occasion (RO), and the first random access parameter further includes third indication information configured to indicate whether the RO supports the 2-step random access.

Optionally, the first random access parameter includes two sets of sub-parameters, and the two sets of sub-parameters correspond to different capabilities and/or types of the first terminal.

Optionally, the first random access parameter includes a first uplink initial access bandwidth, the second random access parameter includes a second uplink initial access bandwidth, and the first uplink initial access bandwidth does not overlap the second uplink initial access bandwidth in a frequency domain.

Optionally, the receiving module 601 is configured to receive the configuration information sent through a first message, in which the first message is a system message or a radio resource configuration message.

Optionally, the receiving module 601 is configured to receive the configuration information sent through a first message, the first uplink initial access bandwidth overlaps the second uplink initial access bandwidth in the frequency domain, and the first uplink initial access bandwidth and the second uplink initial access bandwidth are indicated by a same filed in the first message.

Optionally, the apparatus further includes an access mode determining module 603, configured to determine a random access mode; a sending module 604, configured to: use a resource for the 2-step random access to send a message A, in response to determining that the random access mode is the 2-step random access; or use a resource for the 4-step random access to send a message 1, in response to determining that the random access mode is the 4-step random access.

Optionally, the access mode determining module 603 is configured to: determine a path loss value between the terminal and an access network device; and determine the random access mode based on a magnitude relation between the path loss value and a path loss threshold, in which the first terminal and the second terminal correspond to different path loss thresholds.

Figure 9:
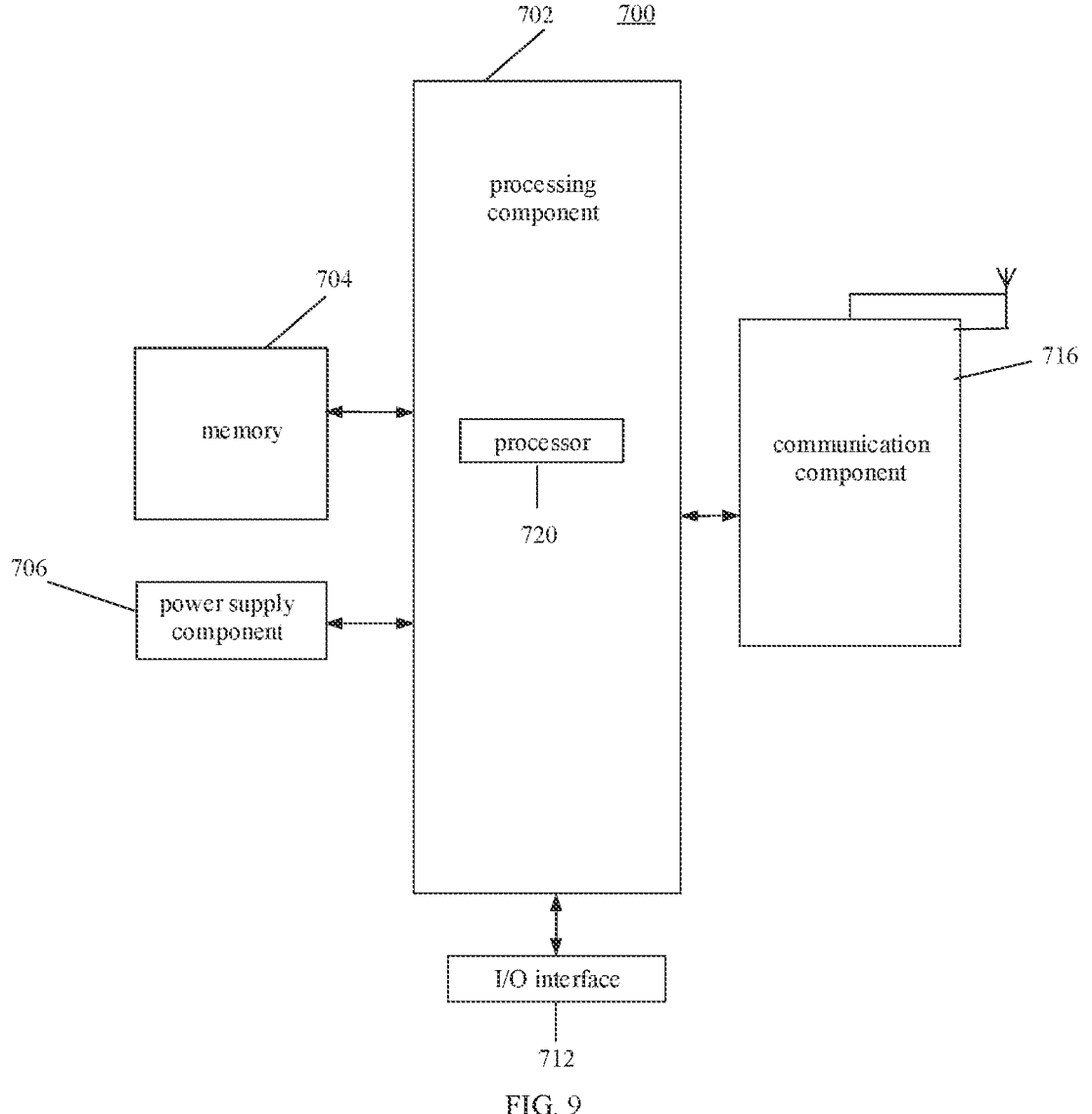
FIG. 9 is a block diagram illustrating a communication apparatus for random access according to an embodiment of the disclosure.

FIG. 9 is a block diagram illustrating a communication apparatus 700 for random access according to an embodiment of the disclosure. The apparatus 700 may be the above mentioned access network device. Referring to FIG. 9, the apparatus 700 may include one or more components of the followings: a processing component 702, a memory 704, a power supply component 706, an input/output (I/O) interface 712, and a communication component 716.

The processing component 702 generally controls the whole operation of the apparatus 700, such as the operations related to display, phone call, data communication, camera operation and recording operation. The processing component 702 may include one or more processors 720 to perform instructions, to complete all or part of blocks of the above method. In addition, the processing component 702 may include one or more modules for the convenience of interaction between the processing component 702 and other components.

The memory 704 is configured to store all types of data to support the operation of the apparatus 700. The memory 704 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 706 may provide power for all components of the apparatus 700. The power supply component 706 may include a power supply management system, one or more power supplies, and other units related to generating, managing and distributing power for the apparatus 700.

The I/O interface 712 provides an interface for the processing component 702 and the peripheral interface module, and the peripheral interface module may be a keyboard, a click wheel, a button, etc. The button may include but not limited to a home button, a volume button, a start button and a lock button.

The communication component 716 is configured for the convenience of wire or wireless communication between the access network device and other devices. The communication component 716 may provide wireless networks based on communication standard, such as 2G or 3G or 4G or 5G, or their combination, to connect with the terminal.

In an embodiment, the apparatus 700 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform any of the above communication methods.

In an embodiment, a non-transitory computer-readable storage medium is further provided which includes instructions, such as the memory 704 including instructions, the instructions may be executed by the processor 720 of the apparatus 700 to complete the above methods. For example, the non-transitory computer-readable storage medium may be a ROM, a random access memory (RAM), a CD-ROM, a magnetic tape, a floppy disk, an optical data storage device, etc.

Figure 10:
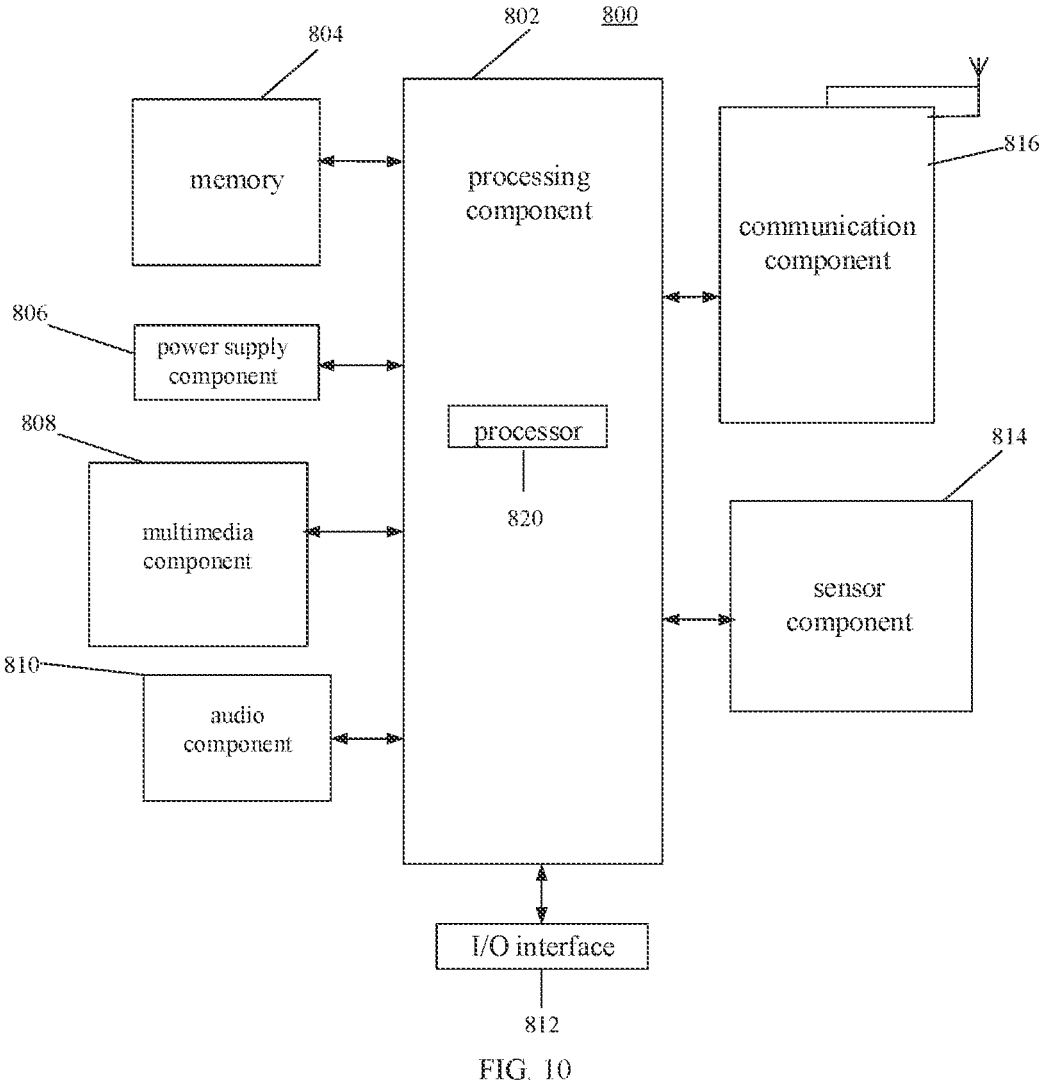
FIG. 10 is a block diagram illustrating a communication apparatus for random access according to an embodiment of the disclosure.

FIG. 10 is a block diagram illustrating a communication apparatus 800 for random access according to an embodiment of the disclosure. The apparatus 800 may be the above mentioned terminal. Referring to FIG. 10, the apparatus 800 may include one or more components of the followings: a processing component 802, a memory 804, a power supply component 806, a multimedia component 808, an audio component 810, an input/output (I/O) interface 812, a sensor component 814, and a communication component 816.

The processing component 802 generally controls the whole operation of the apparatus 800, such as the operations related to display, phone call, data communication, camera operation and recording operation. The processing component 802 may include one or more processors 820 to perform instructions, to complete all or part of blocks of the above methods. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the apparatus 800. Examples of the data include the instructions of any applications or methods operated on the apparatus 800, contact data, phone book data, messages, pictures, videos, etc. The memory 804 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 806 may provide power for all components of the apparatus 800. The power supply component 806 may include a power supply management system, one or more power supplies, and other units related to generating, managing and distributing power for the apparatus 800.

The multimedia component 808 includes an output interface screen provided between the apparatus 800 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 808 includes a front camera and/or a rear camera. When the apparatus 800 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 810 is configured to output and/or input an audio signal. For example, the audio component 810 includes a microphone (MIC). When the apparatus 800 is in an operation mode, such as a call mode, a record mode, and a speech recognition mode, the microphone is configured to receive the external audio signal. The received audio signal may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The button may include but not limited to a home button, a volume button, a start button and a lock button.

The sensor component 814 includes one or more sensors, configured to provide various aspects of status assessment for the apparatus 800. For example, the sensor component 814 may detect the on/off state of the apparatus 800 and the relative positioning of the component. For example, the component is a display and a keypad of the apparatus 800. The sensor component 814 may further detect the location change of the apparatus 800 or one component of the apparatus 800, the presence or absence of contact between the user and the apparatus 800, the orientation or acceleration/deceleration of the apparatus 800, and the temperature change of the apparatus 800. The sensor component 814 may include a proximity sensor configured to detect the existence of the objects nearby without any physical contact. The sensor component 814 may further include a light sensor such as a complementary metal oxide semiconductor (CMOS) or a charge-coupled device (CCD) image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the apparatus 800 and other devices. The apparatus 800 may access wireless networks based on communication standard, such as 2G or 3G or 4G or 5G, or their combination, to implement the random access. In an embodiment, the communication component 816 receives broadcast signals or broadcast-related information from an external broadcast management system via a broadcast channel. Optionally, the communication component 816 further includes a near field communication (NFC) module.

In an embodiment, the apparatus 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform any of the above communication methods.

In an embodiment, a non-transitory computer-readable storage medium is further provided which includes executable instructions, such as the memory 804 including executable instructions, the executable instructions may be executed by the processor 820 of the apparatus 800 to complete the above methods. For example, the non-transitory computer-readable storage medium may be a ROM, a random access memory (RAM), a CD-ROM, a magnetic tape, a floppy disk, an optical data storage device, etc.

The embodiments of the disclosure further provide a communication system. The communication system includes an access network device and a terminal. The access network device includes the communication apparatus for random access provided in the embodiment shown in FIG. 9. The terminal includes the communication apparatus for random access provided in the embodiment shown in FIG. 10.

Other implementations of the present disclosure will readily occur to those skilled in the art upon consideration of the specification and practice of the invention disclosed herein. The disclosure is intended to cover any variations, uses, or adaptations of the disclosure that follow the general principles of the disclosure and include common general knowledge or techniques in the technical field not disclosed by the disclosure. The specification and examples are to be regarded as exemplary only, the true scope and spirit of the disclosure being indicated by the following claims.

It should be understood that the disclosure is not limited to the precise structure described above and shown in the drawings, and various modifications and changes may be made without departing from its scope. The scope of the present disclosure is only limited by the appended claims.

What is claimed is:

1. A communication method for random access, comprising:

generating, by an access network device, configuration information, wherein the configuration information comprises a first random access parameter of a first terminal and a second random access parameter of a second terminal, the first terminal and the second terminal have different capabilities, and the first random access parameter is at least partially different from the second random access parameter; and sending, by the access network device, the configuration information, wherein one of the first terminal and the second terminal determines path loss information between the one of the first terminal and the second terminal and the access network device, and determines a random access mode as a 4-step random access or a 2-step random access based on a magnitude relationship between the path loss information and a threshold corresponding to the one of the first terminal and the second terminal, wherein the first random access parameter comprises:

first indication information configured to indicate whether the first terminal supports the 2-step random access; and a first random access resource comprising a first physical uplink shared channel (PUSCH) resource for transmitting a message A, and the second random access parameter comprises a second random access resource comprising a second PUSCH resource for transmitting the message A different from the first PUSCH resource.

2. The method of claim 1, wherein the capabilities of the first terminal and the second terminal are determined based on a maximum transmission bandwidth supported by each of the first terminal and the second terminal, and the maximum transmission bandwidth supported by the first terminal is smaller than the maximum transmission bandwidth supported by the second terminal.

3. The method of claim 1, wherein, the first indication information indicates that the first terminal supports the 2-step random access, the first random access resource comprises a resource for the 2-step random access and a resource for a 4-step random access; or the first indication information indicates that the first terminal does not support the 2-step random access, the first random access resource comprises a resource for a 4-step random access.

4. The method of claim 1, wherein, the first indication information indicates that the first terminal supports the 2-step random access, the first random access parameter further comprises second indication information configured to indicate a modulation and demodulation scheme for transmitting a message B.

5. The method of claim 1, wherein the first random access resource further comprises:

a first random access occasion (RO).

6. The method of claim 5, wherein the second random access resource further comprises:

a second random access occasion (RO) different from the first RO.

7. The method of claim 5, wherein the first random access parameter further comprises third indication information configured to indicate whether the first RO supports the 2-step random access.

8. A non-transitory computer-readable storage medium having stored therein instructions that, when executed by a processor, cause the processor to perform the method of claim 1.

9. The method of claim 1, wherein the first random access parameter comprises a first uplink initial access bandwidth, the second random access parameter comprises a second uplink initial access bandwidth, and the first uplink initial access bandwidth at least partially overlaps the second uplink initial access bandwidth in a frequency domain.

10. A communication method for random access, comprising:

receiving, by a target terminal, configuration information, wherein the configuration information comprises a first random access parameter of a first terminal and a second random access parameter of a second terminal, the first terminal and the second terminal have different capabilities, and the first random access parameter is at least partially different from the second random access parameter;

determining, by the target terminal, a target random access parameter based on the first random access parameter, the second random access parameter, and a capability of the target terminal;

determining, by the target terminal, path loss information between the target terminal and an access network device; and determining a random access mode as a 4-step random access or a 2-step random access based on a magnitude relationship between the path loss information and a threshold corresponding to the target terminal, wherein the first random access parameter comprises:

first indication information configured to indicate whether the first terminal supports the 2-step random access; and a first random access resource comprising a first physical uplink shared channel (PUSCH) resource for transmitting a message A, the second random access parameter comprises a second random access resource comprising a second PUSCH resource for transmitting the message A different from the first PUSCH resource.

11. The method of claim 10, wherein the capabilities of the first terminal and the second terminal are determined based on a maximum transmission bandwidth supported by each of the first terminal and the second terminal, and the maximum transmission bandwidth supported by the first terminal is smaller than the maximum transmission bandwidth supported by the second terminal.

12. A terminal, comprising:

a processor; and a memory configured to store instructions executable by the processor;

wherein the processor is configured to perform the method of claim 10.

13. A non-transitory computer-readable storage medium having stored therein instructions that, when executed by a processor, cause the processor to perform the method of claim 10.

14. The method of claim 10, wherein the first random access parameter comprises a first uplink initial access bandwidth, the second random access parameter comprises a second uplink initial access bandwidth, and the first uplink initial access bandwidth at least partially overlaps the second uplink initial access bandwidth in a frequency domain.

15. An access network device, comprising:

a processor; and a memory configured to store instructions executable by the processor;

wherein the processor is configured to:

generate configuration information, wherein the configuration information comprises a first random access parameter of a first terminal and a second random access parameter of a second terminal, the first terminal and the second terminal have different capabilities, and the first random access parameter is at least partially different from the second random access parameter; and send the configuration information, wherein one of the first terminal and the second terminal determines path loss information between the one of the first terminal and the second terminal and the access network device, and determines a random access mode as a 4-step random access or a 2-step random access based on a magnitude relationship between the path loss information and a threshold corresponding to the one of the first terminal and the second terminal, wherein the first random access parameter comprises:

first indication information configured to indicate whether the first terminal supports the 2-step random access; and a first random access resource comprising a first physical uplink shared channel (PUSCH) resource for transmitting a message A, the second random access parameter comprises a second random access resource comprising a second PUSCH resource for transmitting the message A different from the first PUSCH resource.

16. The access network device of claim 15, wherein the capabilities of the first terminal and the second terminal are determined based on a maximum transmission bandwidth supported by each of the first terminal and the second terminal, and the maximum transmission bandwidth supported by the first terminal is smaller than the maximum transmission bandwidth supported by the second terminal.

* * * * *